(12) United States Patent
Rout et al.

(10) Patent No.: US 12,246,742 B2
(45) Date of Patent: Mar. 11, 2025

(54) METHOD AND CONTROL DEVICE FOR PROVIDING FEEDBACK TO A VEHICLE OCCUPANT

(71) Applicants: Volkswagen Aktiengesellschaft, Wolfsburg (DE); AUDI AG, Ingolstadt (DE); Dr. Ing. h.c. F. Porsche Aktiengesellschaft, Stuttgart (DE)

(72) Inventors: Samantha Rout, Stuttgart (DE); Fabian Klausmann, Stuttgart (DE); Bastian Freese, Stuttgart (DE); Andrian Riedel, Gerlingen (DE); Dij Jayaratna, San Francisco, CA (US); Christian Delise, San Mateo, CA (US); Erik Glaser, San Francisco, CA (US); Alisia Martinez, San Francisco, CA (US); Alexander Bogner, Bad Liebenzell (DE); Lutz Krauss, Karlsruhe (DE)

(73) Assignees: VOLKSWAGEN AKTIENGESELLSCHAFT, Wolfsburg (DE); AUDI AG, Ingolstadt (DE); DR. ING. H.C. F. PORSCHE AG, Stuttgart (DE)

( * ) Notice: Subject to any disclaimer, the term of this patent is extended or adjusted under 35 U.S.C. 154(b) by 344 days.

(21) Appl. No.: 17/760,820

(22) PCT Filed: Nov. 22, 2019

(86) PCT No.: PCT/EP2019/082217
§ 371 (c)(1),
(2) Date: Mar. 16, 2022

(87) PCT Pub. No.: WO2021/052610
PCT Pub. Date: Mar. 25, 2021

(65) Prior Publication Data
US 2022/0340159 A1 Oct. 27, 2022

Related U.S. Application Data

(60) Provisional application No. 62/900,874, filed on Sep. 16, 2019.

(51) Int. Cl.
*B60W 50/16* (2020.01)
*B60W 50/08* (2020.01)
*B60W 60/00* (2020.01)

(52) U.S. Cl.
CPC .......... *B60W 50/16* (2013.01); *B60W 50/082* (2013.01); *B60W 60/005* (2020.02); *B60W 2520/105* (2013.01); *B60W 2540/215* (2020.02)

(58) Field of Classification Search
CPC .. B60W 50/16; B60W 60/005; B60W 50/082; B60W 2540/215; B60W 2520/105
See application file for complete search history.

(56) References Cited

U.S. PATENT DOCUMENTS 9,145,129 B2 *  9/2015  Worrel ................. B60R 16/037
9,348,334 B2 *  5/2016  McGinn ............... G05D 1/0061
(Continued)

FOREIGN PATENT DOCUMENTS

DE    102012002318 A1    8/2013    ............ B60W 30/08
WO    2021/052610 A1     3/2021    ............ B60K 37/06

OTHER PUBLICATIONS

International Search Report and Written Opinion, Application No. PCT/EP2019/082217, 11 pages, Jun. 9, 2022.

*Primary Examiner* — Ramsey Refai
(74) *Attorney, Agent, or Firm* — Slayden Grubert Beard PLLC

(57) ABSTRACT

In a method and control device for providing feedback to a vehicle occupant, a signal corresponding to current and/or
(Continued)

upcoming movements of the vehicle is obtained when the vehicle is in an autonomous driving mode. The obtained signal is provided to a control device located within the cabin of the vehicle. The control device is moved corresponding to the provided signal. In an embodiment, an input of the occupant for an autonomous driving unit of the vehicle via the control device is received and a signal corresponding to the received input is submitted to the autonomous driving unit. The input may correspond to a maneuver request and/or to a selection of one of several autonomous driving-modes.

20 Claims, 6 Drawing Sheets

(56) References Cited

U.S. PATENT DOCUMENTS

| | | | | |
|---|---|---|---|---|
| 9,845,866 | B2 * | 12/2017 | Drees | B60W 30/182 |
| 10,322,721 | B2 * | 6/2019 | Coburn | B60W 30/143 |
| 2016/0318442 | A1 | 11/2016 | James | 701/23 |
| 2018/0141548 | A1 | 5/2018 | Coburn et al. | |
| 2019/0077419 | A1 | 3/2019 | Samma et al. | |

\* cited by examiner

METHOD AND CONTROL DEVICE FOR PROVIDING FEEDBACK TO A VEHICLE OCCUPANT

CROSS-REFERENCE TO RELATED APPLICATIONS

This application claims priority to U.S. Provisional Patent Application No. 62/900,874, filed on Sep. 16, 2019. The contents of the aforesaid Patent Application are incorporated herein for all purposes.

TECHNICAL FIELD

The present invention relates generally to a method and control device for providing feedback to an occupant of a vehicle, and more particularly to providing feedback to the occupant when the vehicle is in an autonomous driving mode.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Autonomous driving allows vehicles such as self-driving cars to move safely with little or no human input based on a variety of sensors, which perceive their surroundings. Depending on the amount of driver intervention and attentiveness required, classification systems define different levels, typically ranging from fully manual to fully automated systems. For example, the standard SAE J3016 defines six such levels, wherein for levels 0 to 2 the human driver still monitors the driving environment with no automation at all, some driver assistance or partial automation and for levels 3 to 5 an automated driving system monitors the driving environment and performs the driving tasks with different levels of possible driver intervention. In autonomous driving modes, the driver is not required to hold traditional vehicle controls. This physical disconnection from the vehicle's movements may result in increased possibilities of distraction, inability to react to emergencies, and motion sickness.

SUMMARY

According to the present disclosure, a method and control device for providing feedback to an occupant of a vehicle is provided that at least partially removes the physical disconnection from the vehicle's movement when the vehicle is in an autonomous driving mode.

According to a general aspect of at least one embodiment, a method for providing feedback to an occupant of a vehicle is presented, comprising:
  obtaining a signal corresponding to current and/or upcoming movements of the vehicle when the vehicle is in an autonomous driving mode;
  providing the obtained signal to a control device located within the cabin of the vehicle; and
  moving the control device corresponding to the provided signal.

DESCRIPTION

Figure 1:
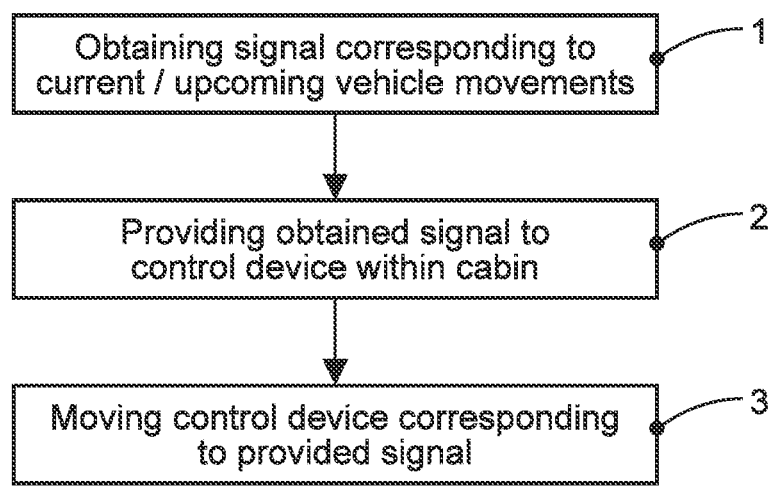
FIG. 1 is an example flow chart showing a method for providing feedback to a vehicle occupant.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

As discussed in the preceding, according to a general aspect of at least one embodiment, a method for providing feedback to an occupant of a vehicle is presented, comprising:
  obtaining a signal corresponding to current and/or upcoming movements of the vehicle when the vehicle is in an autonomous driving mode;
  providing the obtained signal to a control device located within the cabin of the vehicle; and
  moving the control device corresponding to the provided signal.

In one embodiment, the current and/or upcoming movements include a lateral movement of the vehicle.

Beneficially, for a lateral movement of the vehicle to the left the control device is shifted and/or tilted to the left and for a lateral movement of the vehicle to the right the control device is shifted and/or tilted to the right.

In a further embodiment, the current and/or upcoming movements include an acceleration or deceleration of the vehicle.

Beneficially, for an acceleration of the vehicle, the control device is shifted and/or tilted forwards and for a deceleration of the vehicle, the control device is shifted and/or tilted backwards.

According to an embodiment, the method further comprises:
  receiving an input of the occupant for an autonomous driving unit of the vehicle via the control device; and
  submitting a signal corresponding to the received input to the autonomous driving unit.

For this embodiment, it is possible that an input of the occupant corresponds to a maneuver request for the vehicle to be performed by the autonomous driving unit.

Furthermore, it is possible that one or more of directional inputs are predefined for the control device and for a received directional input of the occupant a corresponding maneuver of the vehicle is performed by the autonomous driving unit.

Similarly, it is possible that an input of the occupant corresponds to a selection of one of several autonomous driving-modes of the autonomous driving unit.

According to another general aspect of at least one embodiment, a control device for providing feedback to an occupant of a vehicle is presented, comprising:

means for obtaining a signal corresponding to current and/or upcoming movements of the vehicle when the vehicle is in an autonomous driving mode;

means for providing the obtained signal to the control device; and means for moving the control device corresponding to the provided signal.

In one embodiment, the means for moving cause a lateral tilt or shift of the control device in case of a lateral movement of the vehicle and/or a longitudinal tilt or shift of the control device in case of an acceleration or deceleration of the vehicle.

According to an embodiment, the control device further comprises:

means for receiving an input of the occupant for an autonomous driving unit of the vehicle; and means for submitting a signal corresponding to the received input to the autonomous driving unit.

In this embodiment, it is beneficial when the means for receiving an input has one or more predefined directional inputs and a received directional input of the occupant causes a corresponding maneuver of the vehicle by the autonomous driving unit.

Furthermore, the means for receiving an input may include a rotating wheel control element embedded in the front of the control device, wherein a rotation of the wheel by the occupant causes a selection of one of several autonomous driving-modes of the autonomous driving unit.

According to another embodiment, the control device further comprises:

means for moving the control device between a recessed position and an extended position, wherein the recessed position corresponds to a manual driving mode of the vehicle and the extended position corresponds to an autonomous driving mode of the vehicle.

Finally, in at least one embodiment, a vehicle comprises within the cabin a control device as described above.

The present disclosure may be better understood by consideration of the detailed description below in conjunction with the accompanying FIGS.

It should be understood that the FIGS. are for purposes of illustrating examples of various aspects and embodiments and are not necessarily the only possible configurations. Furthermore, the FIGS. and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

FIG. 1 illustrates an exemplary method according to a general aspect of the method for providing feedback to a vehicle occupant. The vehicle occupant may be located in the cabin of a passenger vehicle, in particular on a driver seat. However, the method can similarly be applied to any vehicle occupant being located at arbitrary positions in a vehicle and furthermore also simultaneously to more than one person.

A signal corresponding to the current and/or upcoming movements of the vehicle is obtained in step 1. The current movement or orientation of the vehicle can be determined by analyzing signals provided by sensors installed in the vehicle. The sensors may permanently monitor vehicle parameters such as the steering angle, the tilt, the longitudinal and/or lateral acceleration of the vehicle. For upcoming movements, the environment ahead of the vehicle can be analyzed using sensors monitoring the vehicle's immediate surroundings such as cameras, radar or LiDAR sensors. Furthermore, imminent vehicle movements can be determined based on the trajectory planning of the vehicle used for purposes such as following curved roads with the vehicle and automated lane changes of the vehicle. Also, a navigation system can provide more coarse data about the future movements of the vehicle based on the current global position of the vehicle determined, e.g., with the help of a GPS sensor and digital maps covering the upcoming route.

At step 2, the obtained signal is provided to a control device within cabin. This control device is specially provided since in an autonomous driving mode of the vehicle, the driver is not required to hold traditional vehicle controls such as a steering wheel. As a consequence, for semi-autonomous vehicles switching to an autonomous driving mode, the steering wheel may temporarily be moved away or folded together to generate more space in front of the vehicle occupant, or the seat of the vehicle occupant may move backwards to provide more legroom and a more comfortable seating position. In fact, according to several concepts of self-driving cars traditional controls such as steering wheels are totally removed from the vehicle.

At step 3, the control device is moved corresponding to the provided signal in order to generate a feedback for a vehicle occupant being in the physical contact with the control device, for example by resting a hand or fingers on the control device. In particular, for a lateral movement of the vehicle to the left the control device may be shifted and/or tilted to the left and for a lateral movement of the vehicle to the right the control device may be shifted and/or tilted to the right. Similarly, for an acceleration of the vehicle, the control device may be shifted and/or tilted backwards and for a deceleration of the vehicle, the control device may be shifted and/or tilted forwards. In this way, the control device matches the movements of the vehicle so that no longer a physical disconnection from the vehicle's movements exists.

This method can run permanently as long as there is an occupant in the vehicle and the vehicle is started. Alternatively, the process can be switched on when the vehicle enters an autonomous driving mode and switched off when the autonomous driving mode is terminated.

Figure 2:
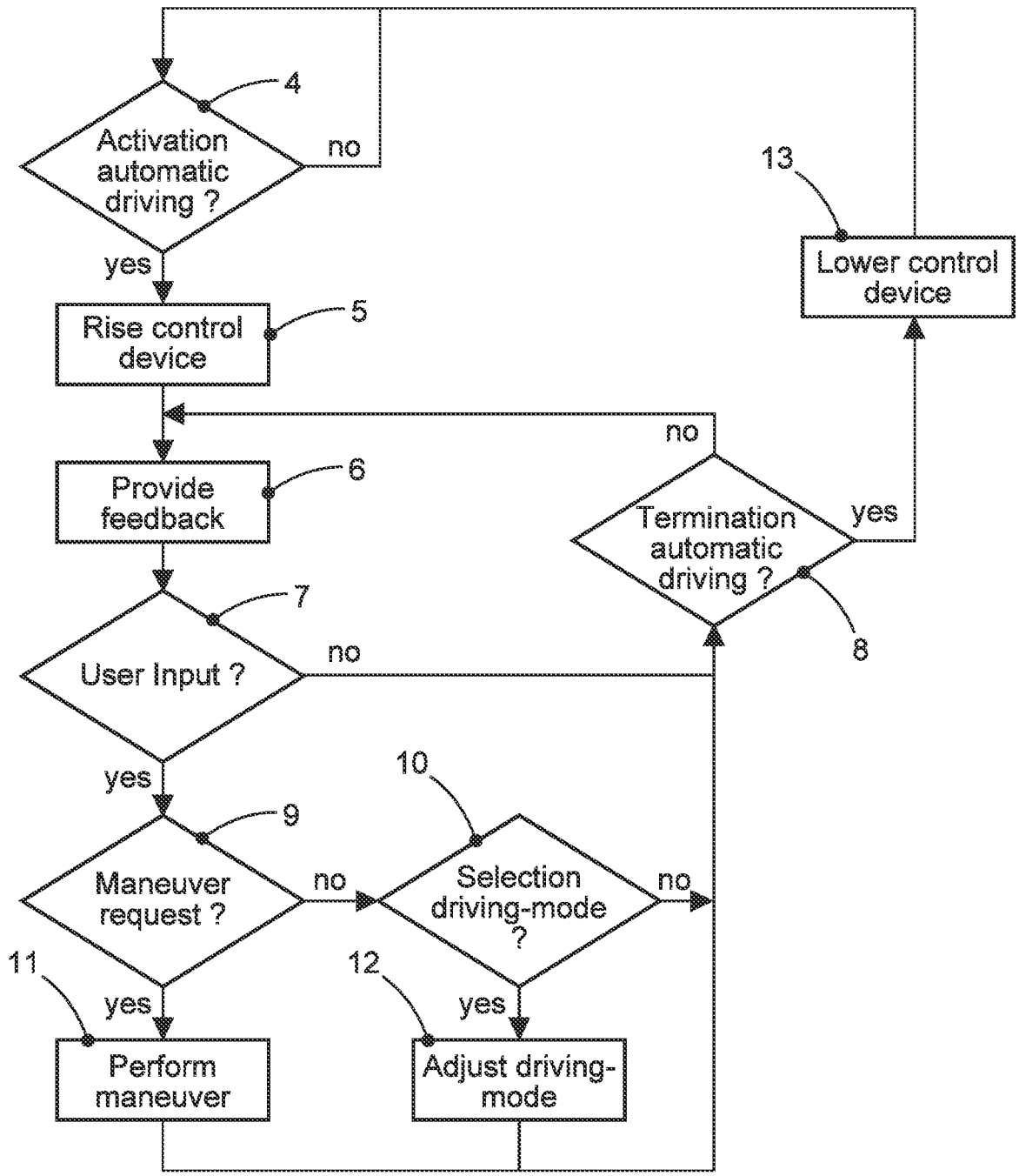
FIG. 2 is a more detailed example flow chart for providing feedback to a vehicle occupant and receiving input from the vehicle occupant.

A more detailed flow chart for providing feedback to a vehicle occupant and optionally receiving input from the vehicle occupant for an autonomous driving unit of the vehicle via the control device is shown in FIG. 2.

In this embodiment, the control device is only active when the vehicle is in an autonomous driving mode. Correspondingly, in step 4 it is determined whether an autonomous driving mode is activated. This activation can be performed manually by the vehicle occupant or automatically, for example when the vehicle enters a highway. If an activation is not determined at this point of time, the process continues to check for such an activation. If an activation is determined, the process proceeds to step 5.

At step 5, the control device rises from a recessed position to an extended position to signal to the vehicle occupant that the vehicle is now driving in an autonomous driving mode and to urge the vehicle occupant to get in physical contact with the control device. Optionally, further indications to underline this request can be given to the vehicle occupant, e.g., by illuminating the control device with integrated light diodes, by a presentation of visual information on a display or a reproduction of an acoustic information. In the recessed position, the control device may be partially or fully covered by car interior materials. If the controller is placed for example within the center console or an armrest, allowing the vehicle occupant to conveniently rest the hand on it during autonomous driving, the control device may move vertically between the recessed and the extended position. However, a movement of the control device in other directions is also possible.

At step 6, the control device within the cabin provides feedback of the vehicle's current and upcoming movements to the vehicle occupant. If the vehicle is moving to the left, the controller will shift left. If the vehicle is moving to the right, the controller will shift right. If the vehicle is accelerating, the controller will shift away forward. If the vehicle is decelerating, the device will shift backward. These motions are combined when applicable, e.g., for a vehicle simultaneously turning left and decelerating, the control device will shift diagonally to the left front. Even if the vehicle is moving straight on, the vehicle occupant receives feedback since the control device then returns to or remains in a middle position.

Furthermore, the control device may also act as an input device for the vehicle occupant, allowing the vehicle occupant to maintain control of an autonomously driven vehicle when out-of-reach from traditional control elements. Providing feedback about the vehicle's movements to the vehicle occupant via a dedicated control device and at the same time allowing user input for the autonomous driving mode via the same control device is particularly convenient and intuitive for the vehicle occupant.

For this purpose, it is determined in step 7 whether the vehicle occupant has submitted an input to the autonomous driving unit of the vehicle via the control device. If a user input is not detected in this step and a termination of the autonomous driving mode is not determined in step 8, the process continues to provide feedback according to the vehicle's movements to the vehicle occupant. If a user input is received, the process determines in steps 9 and 10 whether this input concerns a maneuver request or a selection of an autonomous driving-mode for the autonomous driving unit.

If it is determined in step 9 that the user input concerns a maneuver request, the requested maneuver is performed in step 11. In one embodiment, the controller may accept four directional inputs, i.e., forward, backward, left, and right, so that by moving the control device in one of the predefined directions a corresponding maneuver can be submitted to the autonomous driving unit. For example, moving the control device forward may result in speeding up or passing a slow-moving vehicle ahead, moving the control device backward in decreasing speed or remaining in lane behind the slow-moving vehicle. Similarly, moving the control device left or right may e.g., result in changing lanes without any specific cause or passing the vehicle ahead. Based on the currently detected directional input the autonomous driving unit performs the respective corresponding maneuver.

If it is determined in step 10 that the user input concerns a selection of an autonomous driving-mode, the autonomous driving-mode is correspondingly adjusted in step 12. Depending on the selected autonomous driving-mode (e.g., calm vs. sporty) parameters of the autonomous driving unit can be changed such as when and how quickly the transmission shifts.

After steps 11 and 12, respectively, and as long as no termination of the autonomous driving mode is determined in step 8, the process continues to provide feedback and optionally receive and execute user input as mentioned above. If a termination of the autonomous driving mode is determined in step 8, the control device is lowered back to its recessed position in step 13 and the process starts again with step 4 checking for a new activation of the autonomous driving mode.

The feedback on the one hand and the inputs on the other hand can be distinguished in different ways. For example, the feedback may be provided permanently while the user inputs are made only over a short period of time, e.g., by bumping the control device once in a certain direction.

The foregoing description is based on one control device. However, instead of a single control device, also several control devices may be provided in the same vehicle. In this case, feedback can be provided simultaneously to several persons in the vehicle; however, it has to be ensured that at a time just one of these occupants is in charge and can influence the autonomous driving unit by providing user input, in particular the one being located on a driver seat of the vehicle.

Figure 3:
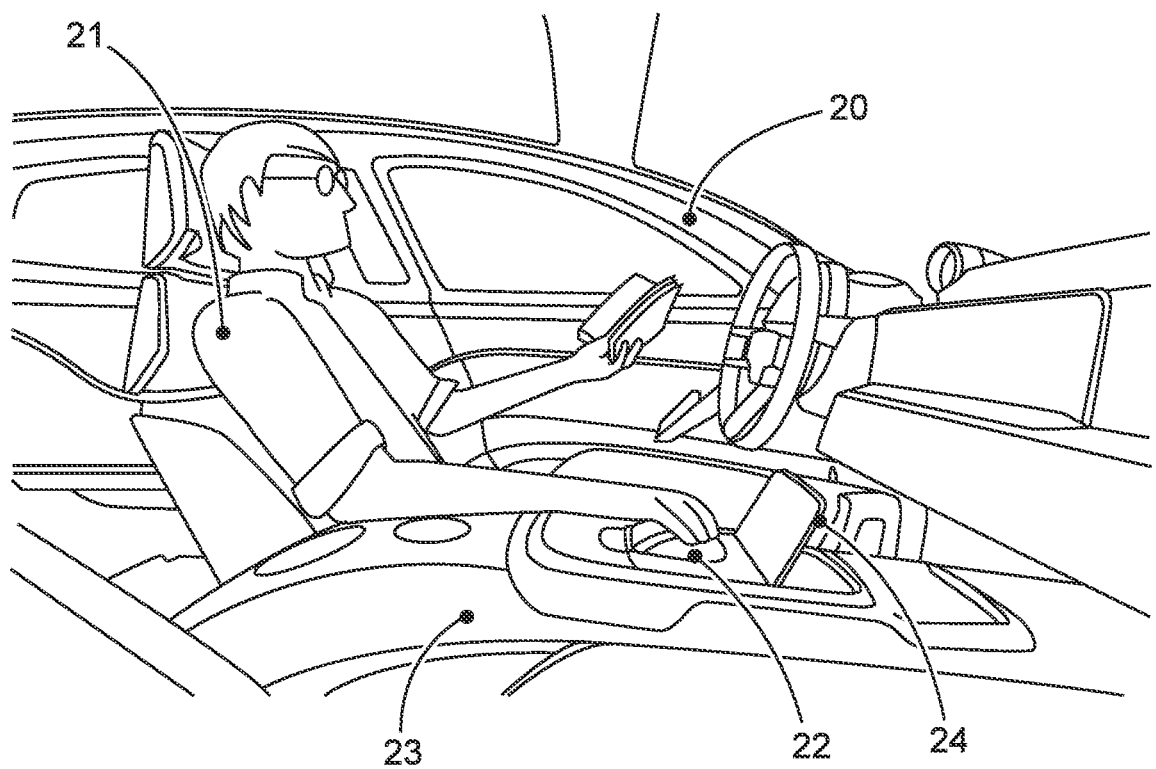
FIG. 3 is an example illustration showing a vehicle cabin with a vehicle occupant using a control device providing feedback.

FIG. 3 illustrates a vehicle cabin 20 with a vehicle occupant 21, who is located on the driver seat of the vehicle and can thus guide the vehicle in a manual driving mode. In the illustrated example, however, the vehicle is in an autonomous driving mode, so that the vehicle occupant 21 can hold a viewed book in one hand and rest the other hand on the control device 22 to receive feedback and, if necessary, make inputs. The control device 22 is located in the center of the front of the vehicle interior between the front driver and front passenger seats at about knee level, integrated in the horizontal part of a center console 23 of the vehicle, which also includes an armrest for the driver and front passenger. The center console may have further comfort, operation and display elements, as in the illustrated case a liquid crystal display 24, which may be used, for example, for displaying a visual confirmation of user inputs for the autonomous driving unit.

Figure 4:
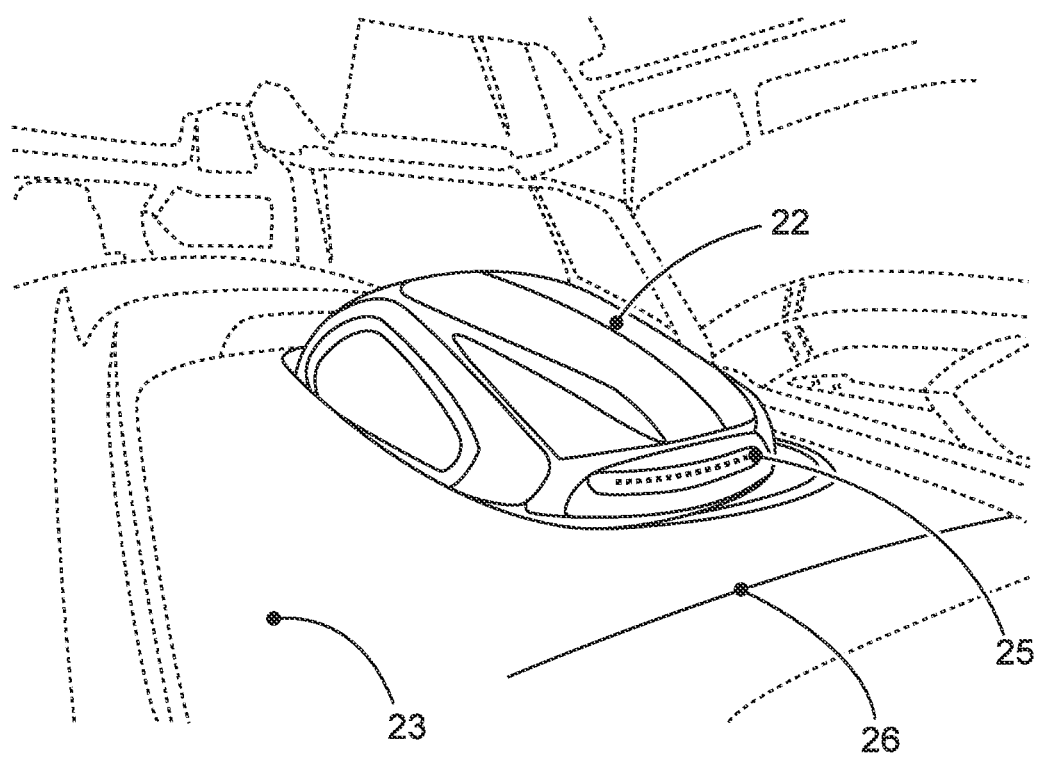
FIG. 4 shows an enlarged view of an example control device and a part of a center console.

An enlarged view of the control device 22 and a part of the center console 23 is shown in FIG. 4. The control device 22 is depicted in the extended position, allowing to provide feedback of the vehicle's movements to the vehicle occupant. In this embodiment the front of the control device 22 includes a rotating wheel control element 25 embedded as an input device for the vehicle occupant. This allows the vehicle occupant to conveniently rotate the rotating wheel control element 25 with the fingertips to select an autonomous driving-mode. However, other implementations and spatial arrangements of the input device are possible. Furthermore, an indication of the currently selected driving dynamics can be displayed on a visual dynamics meter 26 integrated in the center console.

Figure 5:
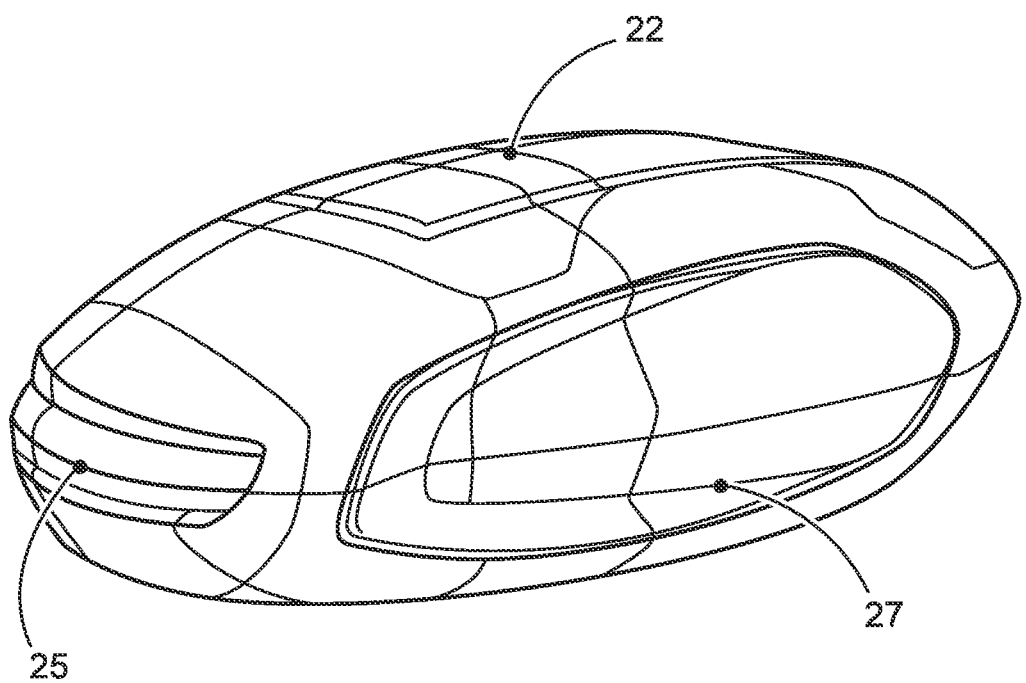
FIG. 5 shows the example control device from the perspective of a vehicle occupant in the driver seat.

FIG. 5 illustrates the control device 22 alone from the left side, i.e., from the perspective of a vehicle occupant in the driver's seat. The control device 22 has an oval shape ergonomically adapted to the shape of the hand. In this embodiment, a further input device 27 in the form of an ergonomically shaped switch is integrated on the left side of the control device, to be conveniently operated with the thumb of the vehicle occupant. This further input device may be used e.g., as a safety or confirmation switch.

Figure 6:
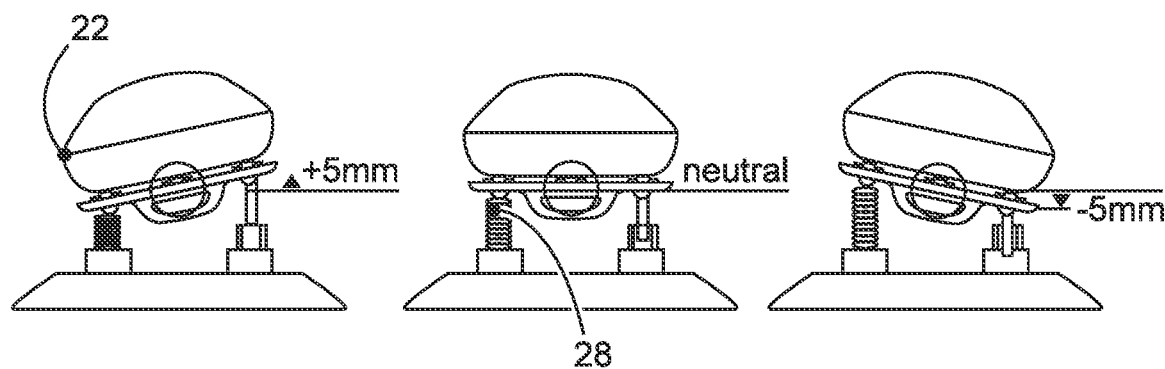
FIG. 6 shows different alignments of the example control device in a view along the longitudinal direction of the center console.
Figure 7:
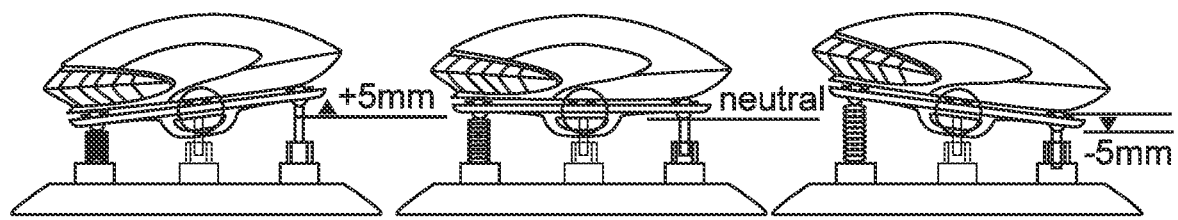
FIG. 7 shows different alignments of the example control device in a lateral view perpendicular to the longitudinal direction of the center console.
Figure 8:
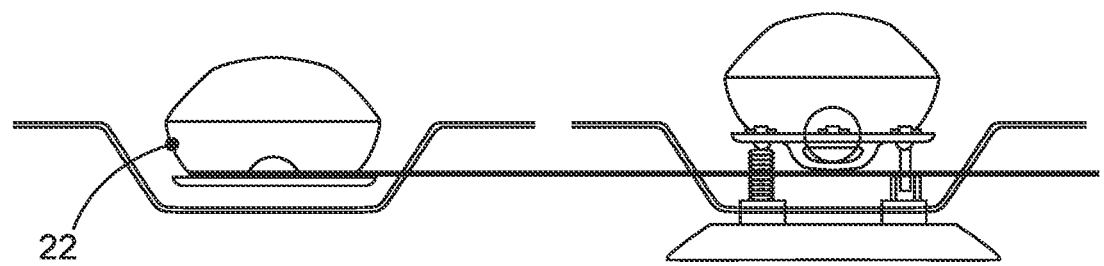
FIG. 8 shows a recessed position and an extended position of the example control device.

The movements of the control device 22 to provide feedback to the vehicle occupant and submit instructions to the autonomous driving unit are illustrated by different alignments of the control device in FIGS. 6, 7 and 8. Since the implementation details of the electromechanical components for tilting or shifting the control device are not the subject of the disclosure, these are shown in the FIGS. only schematically in the form of mechanical mounts 28 provided with springs. Further elements, such as electrical connectors or electronic interfaces to receive feedback signals from a center control unit of the vehicle or submit instructions to the autonomous driving unit of the vehicle are not shown. Also further vehicle interior parts such as a surrounding bezel are omitted in the FIG. for simplicity and clarity.

FIG. 6 shows different alignments of the control device 22 in a view along the longitudinal direction of the center console. The middle part of FIG. 6 shows the controller in a neutral position. This corresponds to a feedback that the vehicle is moving straight with no imminent change of the driving direction. Similarly, the controller is in the neutral position if no maneuver request defined for a movement of the control device in that direction is entered by the vehicle occupant. The illustration on the left shows a lateral tilt of the control device 22 to the left, the illustration on the right a lateral tilt of the control device 22 to the right, corresponding to a feedback that the vehicle is moving to the left or right or a maneuver request defined for that control device movement, respectively.

Similarly, FIG. 7 shows different alignments of the control device 22 in a lateral view perpendicular to the longitudinal direction of the center console. The middle part of FIG. 7 shows again the controller in a neutral position. This corresponds to a feedback that the vehicle is moving with no imminent change of the driving speed and no corresponding maneuver requests are entered by the vehicle occupant, respectively. The illustrations on the left and right show a tilted down front or back of the control device, respectively, providing feedback that the vehicle is accelerating or decelerating corresponding to maneuver requests as mentioned above.

The degree of tilting is chosen so that it is noticeable to the vehicle occupant such as a few millimeters. Furthermore, the tilt can be different depending on the intensity of the change in the vehicle movement and, for example, be chosen proportionally thereto.

FIG. 8 illustrates a recessed position and an extended position of the control device 22 in a view along the longitudinal direction of the center console. In the left part of FIG. 8 the control device is in a recessed position, corresponds to a manual driving mode of the vehicle. In an autonomous driving mode, the control device is in an extended position as shown in the right part of FIG. 8.

The difference in height between the recessed position and the extended position of the control device 22 is hereby, e.g., chosen such that the transition between the manual and autonomous driving mode is clearly distinguishable from the feedback signals, for example in the range of one to several centimeters.

Figure 9:
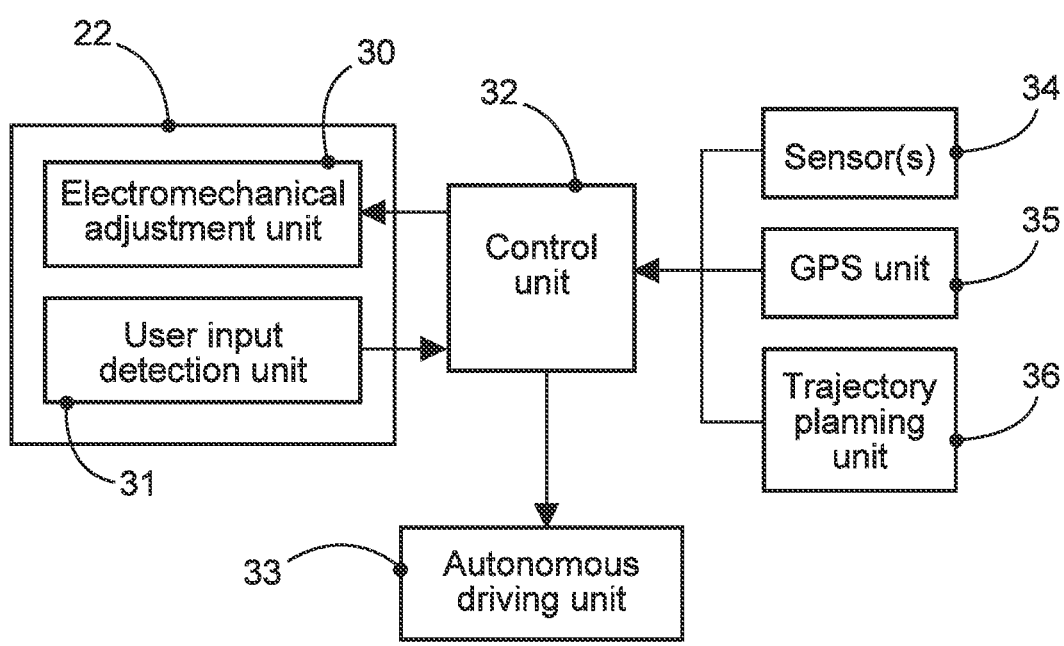
FIG. 9 is an illustration showing a schematic block diagram of an example system including a control device for providing feedback and allowing user input.

FIG. 9 shows a schematic block diagram of a system including a control device for providing feedback and allowing user input. In the embodiment described in the following all shown units are part of the vehicle, which in addition includes further, not shown components such as the chassis and engine. However, in another embodiment some of the units may not be part of the vehicle and may be accessed remotely, such as by a wireless data transmission connection between the remote units and the vehicle.

The control device 22 comprises an electromechanical adjustment unit 30 and a user input detection unit 31. The electromechanical adjustment unit 30 moves the exterior of the control device 22 touched by the vehicle occupant to provide feedback about the vehicle's movements as described above. The electromechanical adjustment unit 30 may be configured as one or more actuators such as piezo actuators or electric motors that convert an electrical signal issued by a control unit 32 in mechanical movements.

User input detection unit 31 detects user input for the autonomous driving mode. For an embodiment as mentioned above, where the control device can be moved in four predefined directions, the orientation of the control device can be detected e.g. by four individual electrical contacts, optical switches or micro switches. In addition, it is possible to detect inputs in a diagonal direction, e.g., by logical processing of two simultaneous activated switches. A signal corresponding to the detected user input is supplied to control unit 32 for further processing such as controlling an autonomous driving unit 33.

In the embodiment of FIG. 9, the electromechanical adjustment unit 30 and the user input detection unit 31 are shown as separate units. Likewise, both could be integrated in a single unit for both providing feedback and input detection, such as one or more electric motors, which are mechanically linked to the exterior of the control device 22, while the control device movement is detected by sensors measuring the electric motor position.

Autonomous driving unit 33 may include a steering control system for controlling the steering angle and a throttle control system for regulating the power supplied by the engine and thus controlling the speed of the vehicle. Furthermore, the vehicle includes one or more sensors 34, a positioning and navigation unit 35, and a trajectory-planning unit 36. The one or more sensors 34 provide information regarding current operating characteristics of the vehicle as well as the physical environment surrounding the vehicle. For example, the vehicle environment can be detected by one or more video cameras, laser-sensing systems such as LiDAR, radar sensors or ultrasonic sensors. Furthermore, navigation-related information provided from a positioning and navigation unit 35, using, for example, the Global Positioning System, can be evaluated to obtain a current position, angular orientation and/or route information of the vehicle. Finally, the trajectory-planning unit 36 determines and optimizes a planned future trajectory for the vehicle when the vehicle is in an autonomous driving mode.

The vehicle sensors 34, positioning and navigation unit 35, and trajectory-planning unit 36, each may provide information usable for estimating current and/or upcoming movements of the vehicle to the control unit 32.

The method and control device can be applied in passenger vehicles, commercial vehicles such as trucks, busses or driverless taxis, and even more generally in any land vehicles, rail vehicles, aircrafts or watercrafts.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the FIGS. may be provided by the use of dedicated hardware as well as hardware capable of executing software in association with appropriate software. When provided by a processor, the functions may be provided by a single dedicated processor, by a single shared processor, or by a plurality of individual processors, some of which may be shared.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

LIST OF REFERENCE NUMERALS 1-13 Method steps
20 Vehicle cabin
21 Vehicle occupant
22 Control device
23 Center console
24 Display
25 Rotating wheel control element
26 Dynamics meter
27 Integrated switch
28 Mechanical mounts
30 Electromechanical adjustment unit
31 User input detection unit
32 Control unit
33 Autonomous driving unit
34 Sensor(s)
35 Positioning and navigation unit
36 Trajectory planning unit The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for providing feedback to an occupant of a vehicle, comprising:
   obtaining a signal corresponding to one or more of current and upcoming movements of the vehicle, wherein the signal is automatically generated by the vehicle when the vehicle is in an autonomous driving mode;
   providing the obtained signal to a controller located within the cabin of the vehicle, wherein the controller is configured to both receive input from the occupant and to provide haptic feedback to the occupant when the controller is touched by the occupant; and
   automatically moving the controller corresponding to the provided signal to indicate to the occupant the one or more of current and upcoming movements of the vehicle as haptic feedback of vehicle movements.

2. The method of claim 1, wherein one or more of the current and the upcoming movements include a lateral movement of the vehicle.

3. The method of claim 2, wherein for a lateral movement of the vehicle to the left the controller is shifted and/or tilted to the left and for a lateral movement of the vehicle to the right the controller is shifted and/or tilted to the right.

4. The method of claim 1, wherein one or more of the current and the upcoming movements include an acceleration or deceleration of the vehicle.

5. The method of claim 4, wherein for an acceleration of the vehicle the controller is shifted and/or tilted forwards and for a deceleration of the vehicle the controller is shifted and/or tilted backwards.

6. The method of claim 1, comprising:
   receiving an input of the occupant for an autonomous driving unit of the vehicle via the controller; and
   submitting a signal corresponding to the received input to the autonomous driving unit.

7. The method of claim 6, wherein an input of the occupant corresponds to a maneuver request for the vehicle to be performed by the autonomous driving unit.

8. The method of claim 7, wherein one or more of directional inputs are predefined for the controller and for a received directional input of the occupant a corresponding maneuver of the vehicle is performed by the autonomous driving unit.

9. The method of claim 6, wherein an input of the occupant corresponds to a selection of one of several autonomous driving-modes of the autonomous driving unit.

10. A controller for providing feedback to an occupant of a vehicle, comprising:
    an input for obtaining a signal corresponding to current and/or upcoming movements of the vehicle, wherein the signal is automatically generated by the vehicle when the vehicle is in an autonomous driving mode; and
    one or more actuators for automatically moving the controller corresponding to the provided signal to indicate to the occupant the current and/or upcoming movements of the vehicle as haptic feedback of vehicle movements; wherein
    the controller is configured to both receive input from the occupant and to provide haptic feedback to the occupant when the controller is touched by the occupant.

11. The controller of claim 10, wherein the one or more actuators cause a lateral tilt or shift of the controller in case of a lateral movement of the vehicle and/or a longitudinal tilt or shift of the controller in case of an acceleration or deceleration of the vehicle.

12. The controller of claim 10, further comprising:
a user input detection unit for receiving an input of the occupant for an autonomous driving unit of the vehicle.

13. The controller of claim 12, wherein the user input detection unit has one or more predefined directional inputs and a received directional input of the occupant causes a corresponding maneuver of the vehicle by the autonomous driving unit.

14. The controller of claim 12, wherein the user input detection comprises a rotating wheel control embedded in the front of the controller and a rotation of the wheel by the occupant causes a selection of one of several autonomous driving-modes of the autonomous driving unit.

15. The control device of claim 10, wherein the control device is configured to be moved between a recessed position and an extended position, wherein the recessed position corresponds to a manual driving mode of the vehicle and the extended position corresponds to an autonomous driving mode of the vehicle.

16. The method of claim 2, wherein one or more of the current and the upcoming movements include an acceleration or deceleration of the vehicle.

17. The method of claim 3, wherein one or more of the current and the upcoming movements include an acceleration or deceleration of the vehicle.

18. The method of claim 2, comprising:
receiving an input of the occupant for an autonomous driving unit of the vehicle via the control device; and
submitting a signal corresponding to the received input to the autonomous driving unit.

19. The method of claim 3, comprising:
receiving an input of the occupant for an autonomous driving unit of the vehicle via the control device; and
submitting a signal corresponding to the received input to the autonomous driving unit.

20. The method of claim 4, comprising:
receiving an input of the occupant for an autonomous driving unit of the vehicle via the control device; and
submitting a signal corresponding to the received input to the autonomous driving unit.

* * * * *